United States Patent [19]
Pfister et al.

[11] 3,835,139
[45] Sept. 10, 1974

[54] N-SUBSTITUTED ACRIDONE CARBOXYLIC ACIDS AND DERIVATIVES

[75] Inventors: Jurg R. Pfister, Los Altos; Ian T. Harrison; John H. Fried, both of Palo Alto, all of Calif.

[73] Assignee: Syntex, (U.S.A.) Inc., Palo Alto, Calif.

[22] Filed: July 19, 1972

[21] Appl. No.: 273,291

[52] U.S. Cl.............. 260/279 R, 260/253, 260/256, 260/268 R, 260/270 R, 260/515 P, 260/518 R, 424/257
[51] Int. Cl............................................. C07d 37/20
[58] Field of Search .............................. 260/270 R

[56] References Cited
UNITED STATES PATENTS

| | | | |
|---|---|---|---|
| 3,072,485 | 1/1963 | Reynolds et al. | 260/279 R |
| 3,519,424 | 7/1970 | Reynolds et al. | 260/279 R |
| 3,642,997 | 2/1972 | Shen | 260/279 R |
| 3,686,180 | 8/1972 | Sutton | 260/279 R |
| 3,766,768 | 12/1972 | Bays | 260/335 |

FOREIGN PATENTS OR APPLICATIONS

| | | | |
|---|---|---|---|
| 44-27388 | 11/1969 | Japan | 260/279 R |
| 564,593 | 10/1958 | Canada | 260/279 R |
| 759,292 | 5/1971 | Belgium | |
| 1,176,934 | 4/1959 | France | 260/279 R |

OTHER PUBLICATIONS

Stapleton et al., CHEM. ABSTR., Vol. 49, Col. 8969 c (1955).

Albert et al., British Jour. Expt'l Path., Vol. 26, pp. 160, 164, (1945).

*Primary Examiner*—Donald G. Daus
*Attorney, Agent, or Firm*—Walter H. Merker; Gerard A. Blaufarb; William B. Walker

[57] ABSTRACT

Compositions containing and methods employing, as the essential ingredient, acridone carboxylic acid compounds which are useful in the treatment of allergic conditions. Methods for preparing thses compounds and compositions are also disclosed. N-methylacridone-2-carboxylic acid and 7-methoxyacridone-2-carboxylic acid are illustrated as representative of the class.

12 Claims, No Drawings

N-SUBSTITUTED ACRIDONE CARBOXYLIC ACIDS AND DERIVATIVES

The present invention is directed to acridone carboxylic acid compounds and to compositions containing and methods utilizing these compounds as the essential ingredient in the treatment of symptoms associated with allergic manifestations, for example, asthmatic conditions.

In a first aspect, the present invention relates to acridone carboxylic acid compounds selected from those represented by the following formulas:

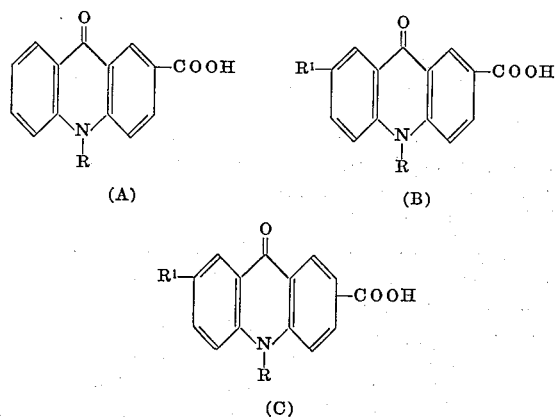

and the pharmaceutically acceptable, non-toxic esters, amides and salts thereof; wherein each R is lower alkyl and each $R^1$ is lower alkyl; lower cycloalkyl; lower alkoxy; lower cycloalkoxy; hydroxy and the conventional esters thereof; halo; mercapto; lower alkylthio; trifluoromethyl; or a group selected from those of the formulas:

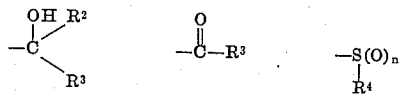

in which $R^2$ is hydrogen, lower alkyl, or cycloalkyl; $R^3$ is hydrogen, lower alkyl, cycloalkyl, phenyl, substituted phenyl (in which the substituent is halo, lower alkyl, lower alkoxy, lower alkylthio, trifluoromethyl, or cyano); or a monocyclic aromatic heterocyclic group having five or six total members, one or two of which are selected from nitrogen, oxygen, and sulfur; n is the integer 1 or 2; $R^4$ is lower alkyl when n is 1 and $R^4$ is lower alkyl, hydroxy, amino, monolower alkylamino, or dilower alkylamino when n is 2.

In a second aspect, the present invention is directed to a method useful for relieving symptoms associated with allergic manifestations, such as are brought about by antigen-antibody (allergic) reactions In the relief of these symptoms, the method hereof serves to inhibit the effects of the allergic reaction when administered in an effective amount. While not intending to be bound by any theoretical mechanism of action, the method hereof is believed to operate by inhibiting the release and/or the action of toxic products, e.g., histamine, 5-hydroxytryptamine, slow releasing substance (SRS-A), and others, which are produced as a result of a combination of specific antibody and antigen (allergic reaction). These properties make the subject compounds particularly useful in the treatment of various allergic conditions.

This aspect of the present invention thus relates to a method useful for inhibiting the effects of the allergic reaction which comprises administering an effective amount of a compound selected from those represented and defined by the above formulas; or a pharmaceutically acceptable non-toxic composition incorporating said compound as an essential ingredient.

The present invention, in a third aspect, is directed to pharmaceutical compositions useful for inhibiting the effects of the allergic reaction comprising an effective amount of a compound selected from those represented and defined by the above formulas; in admixture with a pharmaceutically acceptable non-toxic carrier.

The compounds of the present invention are also smooth muscle relaxants, e.g., bronchial dilators, and are therefore useful in the treatment of conditions in which such agents may be indicated, as for instance, in the treatment of broncho constriction. The compounds of the present invention are also vasodilators and are therefore useful in the treatment of conditions in which such agents may be indicated, as for instance, in renal and cardiac disorders.

In the practice of the method of the present invention, an effective amount of a compound of the present invention or pharmaceutical compositions thereof, as defined above, is administered via any of the usual and acceptable method known in the art, either singly or in combination with another compound or compounds of the present invention or other pharmaceutical agents, such as antibiotics, hormonal agents, and so forth. These compounds or compositions can thus be administered orally, topically, parenterally, or by inhalation and in the form of either solid, liquid, or gaseous dosages including tablets, suspensions, and aerosols, as discussed in more detail hereinafter. The administration can be conducted in single unit dosage form with continuous therapy or in single dose therapy ad libitum. In the preferred embodiments, the method of the present invention is practiced when relief of symptoms is specifically required, or, perhaps, imminent; however, the method thereof is also usefully practiced as continuous or prophylactic treatment.

In view of the foregoing as well as in consideration of the degree or severity of the condition being treated, age of subject, and so forth, all of which factors being determinable by routine experimentation by one skilled in the art; the effective dosage in accordance herewith can vary over a wide range. Generally, an effective amount ranges from about 0.005 to about 100 mg. per kg. of body weight per day and prefearbly from about 0.01 to about 100 mg. per kg. of body weight per day. In alternate terms, an effective amount in accordance herewith generally ranges from about 0.5 to about 7,000 mg. per day per subject.

Useful pharmaceutical carriers for the preparation of the compositions hereof, can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and glycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium carbonate, magnesium stearate, sodium stearate, glyceryl monostearate, sodium chloride, dried skim milk, glycerol, propylene glycol, water, ethanol, and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The compounds of the present invention demonstrate activity as inhibitors of the effects of the allergic reaction as measured by tests indicative of such activity involving passive cutaneous anaphylaxis as substantially described, for example, by J. Goose et al., Immunology, 16, 749 (1969).

Certain of the compounds of the present invention can be prepared in accordance with the following reaction sequence.

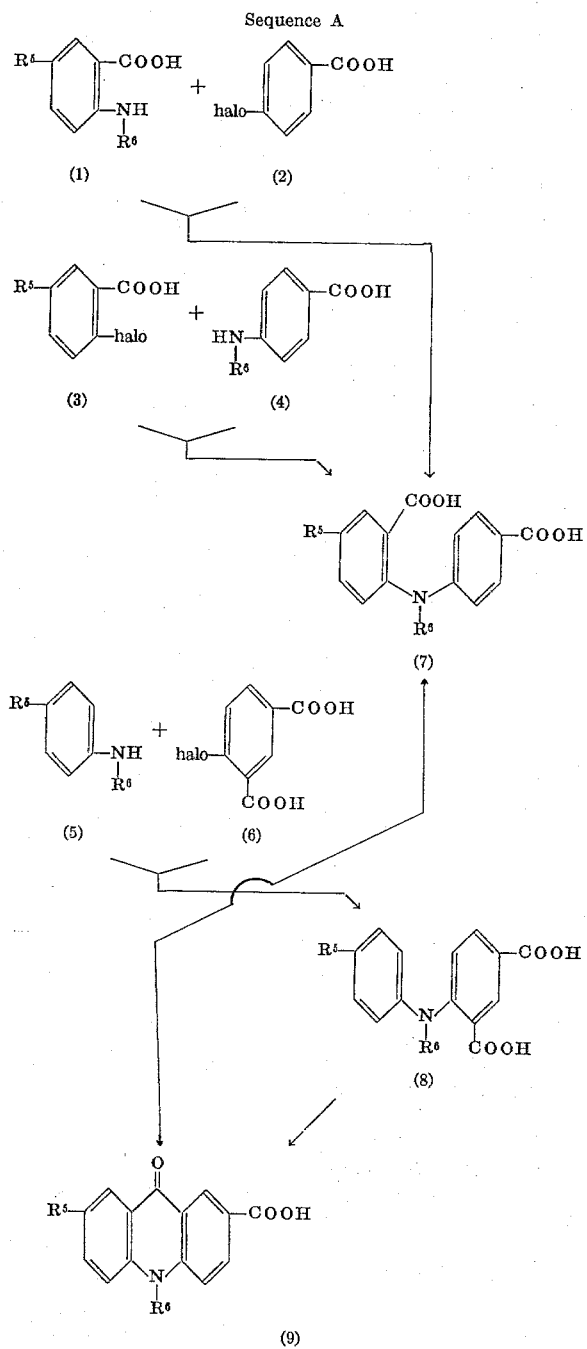

wherein each $R^5$ is hydrogen, halo, lower alkyl, lower alkoxy, hydroxy, mercapto, lower alkylthio, trifluoromethyl, or acyl; $R^6$ is hydrogen or lower alkyl; and halo is bromo, chloro, fluoro, or iodo, preferably bromo or chloro.

With reference to the above reaction sequence, the o-aminobenzoic acid (1) and p-halobenzoic acid (2) are condensed in the presence of copper powder with anhydrous potassium carbonate, optionally in organic liquid reaction medium, preferably in organic amide, such as dimethyl acetamide, dimethylformamide, N-methylpyrrolidone, tetramethylurea, and so forth, to prepare the corresponding diacid compound (7).

The reaction is preferably conducted in an insert organic reaction medium, such as those listed above, or suitable mixtures of one or more of such media. The reaction is further conducted at temperatures ranging from about 80° to about 220°C, preferably from about 120° to about 200°C, and for a period of time sufficient to complete the reaction, ranging from about 2 hours to about 24 hours.

The reaction consumes the reactants on the basis of one mole each of the reactants; however, the amounts of the reactants to be employed are not critical, some of the desired compound (7) product being obtained when employing any proportions thereof. In the preferred embodiments, the reaction is conducted by reacting from about one to about three moles each of the respective starting compounds in the presence of catalytic amounts of the copper powder. The inert organic reaction medium, if employed, is used in solvent amounts.

Similarly, the o-halobenzoic acid (3) and p-aminobenzoic acid (4) are condensed, as described above, to give the product (7). In a similar manner, an excess of the amino-benzene compound (5) is condensed with the 4-halo-1,3-dicarboxybenzene (6), as described above, to give the diacid product (8).

The thus prepared diacid compounds (7) and (8) are then cyclized with phosphoryl chloride, thionyl chloride, sulfuric acid, hydrogen fluoride, or, preferably, polyphosphoric acid (PPA), to give the corresponding substituted acridone-2-carboxylic acid compound (9). The reaction is preferably, but optionally, conducted in an inert organic reaction medium including those usually employed in organic chemical reactions, such as dimethylsulfoxide, sulfolane, benzene, toluene, and so forth. The reaction is further conducted at temperatures ranging from about 60° to about 180°C and for a period of time sufficient to complete the reaction ranging from about 15 minutes to about 90 minutes.

Although the reaction consumes the reactants on the basis of one mole of starting compound (7) or (8) per mole of cyclizing reagent, the reaction can be performed using any proportions of reactants. In the preferred embodiments, however, the reaction is conducted using from about 20 to about 50 moles of the cyclizing reagent per mole of starting compound.

Alternative to the above-described method, the 7-(lower alkoxy) acridone-2-carboxylic acid compounds can also be prepared by following the above-indicated sequence which is practiced using a hydroxy or methoxy substituted ($R^5$) starting compound, (1), (3) or (5), cleaving the methoxy substituted product (9) with hydrobromic or hydroiodic acid and acetic acid, followed by treatment of the thus prepared hydroxy compound (9) with a lower alkyl halide in the presence of base followed by base treatment.

The conventional esters of the thus prepared hydroxy compounds (9) are conventionally prepared by means known to those skilled in the art, for example, by treatment of the hydroxy compound with lower alkanoyl chloride or carboxylic anhydride in pyridine.

In those instances wherein the above procedures are practiced utilizing unsubstituted ($R^6$=hydrogen) starting compounds (1), (4), and (5) so as to prepare the corresponding acridone product (9), the latter can be lower alkylated at the C-10 nitrogen atom to form the corresponding N-alkylacridone products (9, $R^6$=lower alkyl). This alkylation is conducted with a lower alkyl halide, such as a lower alkyl bromide, in the presence of base, such as sodium hydride, and at temperature of from about 20° to about 60°C and for from about one to about four hours. The resultant N-alkylacridone-2-carboxylate is then base hydrolyzed, as described above, to give the product N-alkylacridone-2-carboxylic acids.

The above-described alkylation can alternatively be conducted on the amino starting compounds (1, 4, 5; $R^6$=hydrogen) to give the corresponding $R^6$=lower alkyl starting compounds. Thus obtained are the N-alkylacridone-2-carboxylic acid products (9).

Certain of the compounds of the present invention can be prepared as follows:

wherein $R^{2'}$ is $R^2$ exclusive of hydrogen, $R^{3'}$ is $R^3$ exclusive of hydrogen, $R^6$ is as above defined, and $R^7$ is lower alkyl, preferably methyl.

With reference to the above reaction sequence, the acridone-2-carboxylate (10), prepared by esterification of products (9), is acylated under known Friedel-Crafts conditions to give the corresponding 7-acylacridone-2-carboxylic acid compound (11). This compound can be hydrolyzed, as described above, to give the acylacridone-2-carboxylic acid compounds (16).

Compounds (11) can also be reduced, such as by the known method using sodium borohydride, to give the corresponding 7-(secondary hydroxyalkyl)-acridone-2-carboxylate esters (14) which can be hydrolyzed to the acid products (15).

Compounds (11) can also be treated with alkyl or cycloalkyl (i.e. $R^{2'}$) Grignard reagent, under known Grignard reaction conditions, to give the corresponding 7-(tertiary hydroxyalkyl)-acridone-2-carboxylate esters (12) which can be hydrolyzed to the acid products (13).

with reference to the above reaction sequence, the acridone-2-carboxylic compounds of the formula:

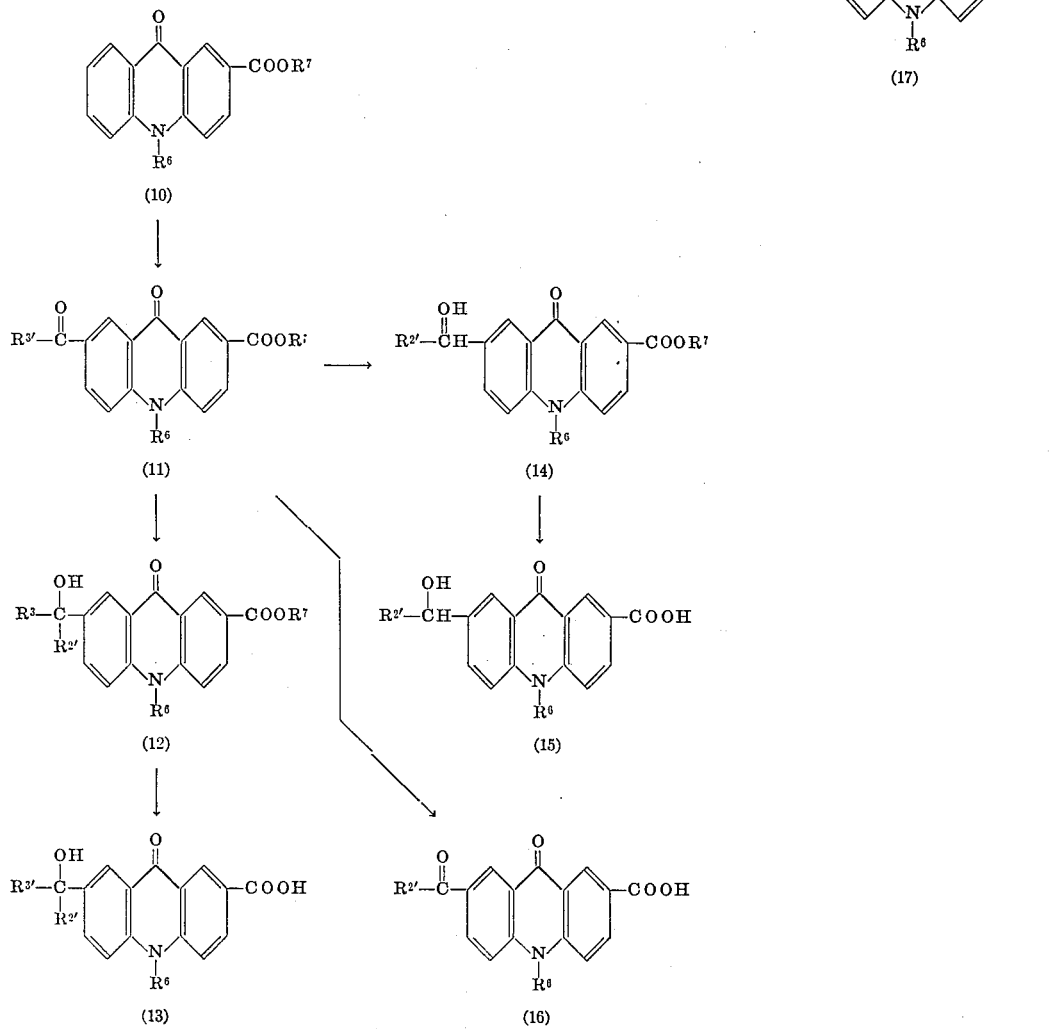

Sequence B are prepared as described above in reaction Sequence A. The resultant compounds (17) or their esters are oxidized with chromium trioxide in acetic acid-acetic anhydride to give the acyl compounds (16) which are reduced or treated with Grignard reagent, as described above, to give the respective (secondary and tertiary hydroxyalkyl)-acridone-2-carboxylic acid products (15 and 13). Alternative to the above procedure, the substituted acridone-2-carboxylic acid (17) can be converted to its corresponding ester and it treated with N-bromosuccinimide to prepare the corresponding (substituted bromomethyl) compound

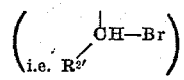

which can be converted to the corresponding alcohol upon treatment with aqueous base, to give the product acids (15).

Certain of the compounds of the present invention can be prepared in accordance with the following reaction sequence:

Sequence C

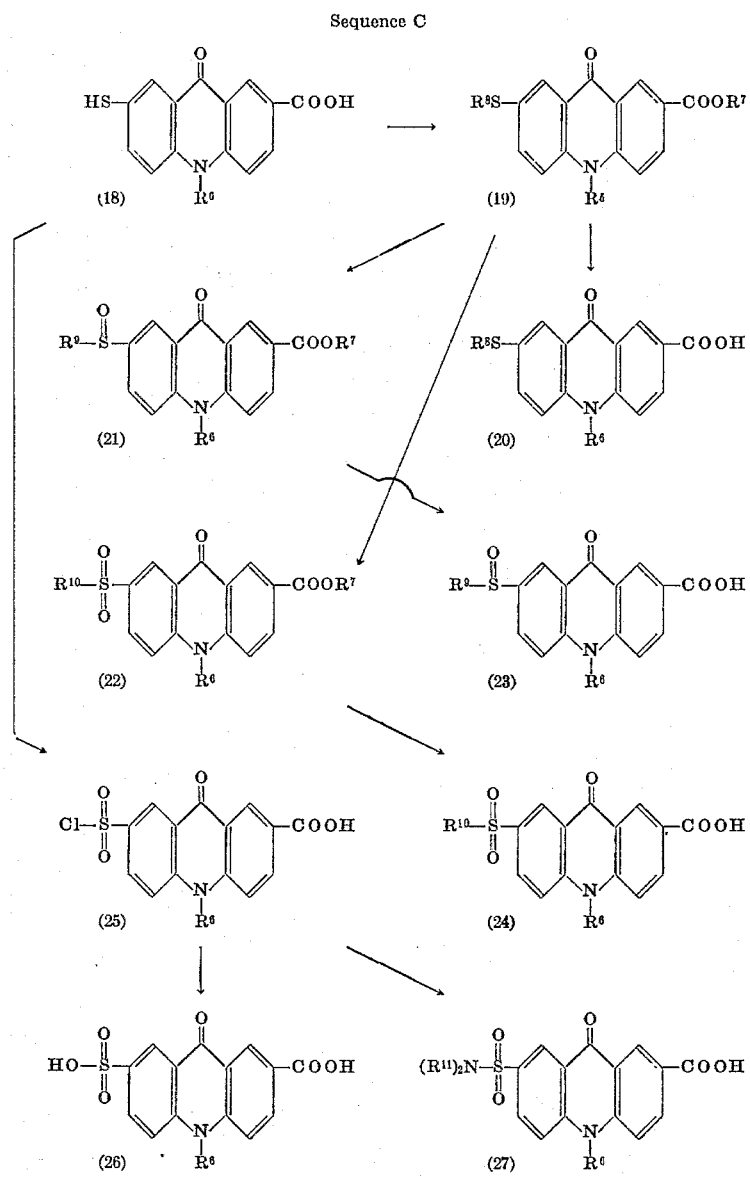

wherein each of $R^6$ and $R^7$ is as defined above, each of $R^8$, $R^9$, and $R^{10}$ is lower alkyl, and $R^{11}$ is hydrogen or lower alkyl.

With reference to the above reaction sequence, the 7-mercaptoacridone-2-carboxylic acid (18) is prepared as described in Sequence A.

Alternatively, a 7-alkoxyacridone-2-carboxylic acid (prepared as described in Sequence A) is converted to the respective 7-hydroxy compound by treatment with hydrobromic or hydroiodic acid and acetic acid at a temperature of from about 100° to about 160°C. The acid esters of the thus prepared 7-hydroxy acid compound is then prepared with the desired lower alkyl iodide in the presence of lithium carbonate at room temperature or with the desired lower alkanol in the presence of a trace of sulfuric acid at reflux. The hydroxy acid esters are then treated with a dialkylthiocarbamoyl chloride, such as dimethylthiocarbamoyl chloride, in the presence of base, such as an alkali metal hydride, and in organic liquid reaction media, preferably an organic amide, such as those listed above, to afford the dialkylthiocarbamoyloxy compounds at temperatures ranging from about 20° to about 100°C, preferably from 60° to about 80°C and for a period of time sufficient to complete the reaction, ranging from about 1 hour to about 6 hours. The latter are then rearranged by reaction at a temperature of from about 200° to about 250°C, preferably from about 220° to about 230°C, and for a period of time ranging from about one hour to about eight hours and in the presence of organic medium, such as sulfolane, nitrobenzene, triethyleneglycol, and so forth, which is preferably employed in solvent amounts, to give the corresponding dialkylcarbamoylthio compounds. These are then converted to the corresponding mercapto acid compounds (18) by base hydrolysis, as described above.

The lower alkylthio ether, ester compounds (19) are then prepared, as described above, or by reacting compounds (18) with a lower alkyl halide in the presence of base, such as potassium carbonate and organic liquid reaction media, such as those described above. The reaction is conducted at a temperature ranging from about 20° to about 80°C, preferably from 50° to about 60°C and for a period of time sufficient to complete the reaction, ranging from about 2 hours to about 16 hours.

Hydrolysis of the ester (19), as described above, affords the (lower alkylthio)-acid compounds (20).

Compound (19) can be oxidized with a peracid, such as peracetic acid, m-chloroperbenzoic acid, p-nitroperbenzoic acid, perphthalic acid, and so forth, to give compounds (21) and (22) which can be hydrolyzed, as above described, to give the corresponding compounds (23) and (24), respectively. The oxidation is preferably conducted in liquid reaction media, such as chlorinated hydrocarbon, e.g. chloroform, methylene chloride, and carbon tetrachloride. The reaction is conducted at temperatures ranging from about 0° to about 60°C, preferably at about 0°C for preparing the sulfinyl compounds and at about room temperature for preparing the sulfonyl compounds and for a period of time sufficient to complete the reaction, ranging from about 1 hour to about 6 hours. In the preferred embodiments, the reaction is conducted by reaction of from about 1 to about 1.1 moles of peracid for preparing the sulfinyl compounds and 2.2 to about 2.5 moles for the sulfonyl compounds.

In said oxidation steps, a mixture of products (21) and (22) may be obtained which mixture can be conventionally separated, such as via chromatography, if desired, to isolate the oxidized products.

The above oxidation steps can also be practiced on starting compounds (20) to give respective products (23) or (24) without the need of a second hydrolysis step.

Alternatively, compounds (18) can be treated with excess chlorine under acidic conditions to afford compounds (25). This reaction is conducted employing a pH of about 1 by use of hydrochloric acid, optionally in acetic acid solution. The reaction is further conducted at temperatures ranging from about 20° to about 100°C, preferably from 50° to about 60°C and for a period of time sufficient to complete the reaction, ranging from about 2 hours to about 12 hours.

Compound (25) is then reacted with a base, such as alkali metal hydroxide, preferably under aqueous conditions and at a temperature ranging from about 20° to about 100°C, preferably from 80° to about 90°C and for a period of from about 1 hour to about 2 hours to give the sulfo-substituted acid compounds (26).

Compounds (25) can be treated with ammonia, monolower alkylamine, or dilower alkylamine to give the sulfamoyl, monolower alkylsulfamoyl, and dilower alkylsulfamoyl acid compounds (27). This reaction is conducted at temperatures ranging from about 0° to about 80°C, preferably from 20° to about 30°C, and for a period of time sufficient to complete the reaction, ranging from about one hour to about eight hours. In the preferred embodiments, the reaction is conducted by reaction of from about 10 to about 20 moles of amine per mole of compound (25). This reaction is further conducted in organic reaction media, such as those described above, preferably tetrahydrofuran, dioxane, dimethylsulfoxide, and so forth.

The 7-chlorosulfonylacridone-2-carboxylic acid compounds (25) are novel intermediates useful as described above.

The starting compounds for use in the present invention are known and can be prepared by processes known per se. Thus, the 1,3-dicarbo(lower)alkoxy-4-halobenzene starting compounds are conveniently prepared by oxidizing 1,3-dimethyl-4-halobenzene (4-halo-m-xylene) with potassium permanganate, as described above, followed by conventional esterification. The o-amino-p-(substituted)-benzoic acid compounds are conveniently prepared by oxidation of the corresponding nitrotoluene, followed by reduction of the nitro group.

The o-halo-p-substituted-benzoic acid starting compounds are prepared by oxidation of the corresponding halo toluenes.

The acid esters of the acridone-2-carboxylic acids hereof are prepared upon treatment of the acid with ethereal diazoalkane, such as diazomethane and diazoethane, or with the desired lower alkyl iodide in the presence of lithium carbonate at room temperature or with the desired lower alkanol in the presence of a trace of sulfuric acid at reflux. The glycerol esters are prepared by treating the acid with thionyl chloride followed by treatment with a suitably protected ethylene glycol or propylene glycol (e.g. solketal) in pyridine, and hydrolyzing the protecting group of the ester thus formed with dilute acid.

The amides of the acridone-2-carboxylic acids hereof are prepared by treatment of the acids with thionyl chloride followed by treatment with anhydrous ammonia, alkyl amine, dialkyl amine, dialkylaminoalkylamine, alkoxyalkylamine, or phenethylamine.

The salts of the acridone-2-carboxylic acids hereof are prepared by treating the corresponding acids with pharmaceutically acceptable base. Representative salts derived from such pharmaceutically acceptable bases are sodium, potassium, lithium, ammonia, calcium, magnesium, ferrous, ferric, zinc, manganous, aluminum, manganic, the salts of trimethylamine, triethylamine, tripropylamine, β-(dimethylamino)ethanol, triethanolamine, β-(diethylamino)ethanol, arginine, lysine, histidine, N-ethylpiperidine, hydrabamine, choline, betaine, ethylenediamine, glucosamine, methyl glucamine, theobromine, purines, piperazine, piperidine, polyamine resins, caffeine, procaine, or the like. The reaction is conducted in an aqueous solution, alone or in combination with an inert, water miscible organic solvent, at a temperature of from about 0°C to about 100°C, preferably at room temperature. Typical inert, water miscible organic solvents include methanol, ethanol, isopropanol, butanol, acetone, dioxane, or tetrahydrofuran. When divalent metal salts are prepared, such as the calcium salts or magnesium salts of the acids, the free acid starting material is treated with about one-half molar equivalent of pharmaceutically acceptable base. When the aluminum salts of the acids are prepared, about one-third molar equivalent of the pharmaceutically acceptable base are employed.

In the preferred embodiment of the present invention, the calcium salts and magnesium salts of the acids are prepared by treating the corresponding sodium or potassium salts of the acids with at least one-half molar equivalent of calcium chloride or magnesium chloride, respectively, in an aqueous solution, alone or in combination with an inert water miscible organic solvent, at a temperature of from about 20° to about 100°C.

In the preferred embodiment of the present invention, the aluminum salts of the acids are prepared by treating the acids with at least one-third molar equivalent of an aluminum alkoxide, such as aluminum triethoxide, aluminum tripropoxide and the like, in a hydrocarbon solvent, such as benzene, xylene, cyclohexane, and the like, at a temperature of from about 20° to about 115°C.

In the present specification and claims, by the term "lower alkyl" is intended a lower alkyl group containing one to five carbon atoms including straight and branched chain groups, for example, methyl, ethyl, n-propyl, isopropyl, n-butyl, isobutyl, sec-butyl, t-butyl, n-pentyl, iso-pentyl, sec-pentyl, and t-pentyl. By the term "lower alkoxy" is intended the group "O-lower alkyl" wherein "lower alkyl" is as defined above. By the term "lower alkyl thio" is intended the group "S-lower alkyl" wherein "lower alkyl" is as defined above. The term "substituted phenyl" includes p-substituted phenyl. The term "monocyclic aromatic heterocyclic group" includes pyridyl, pyridazinyl, pyrimidinyl, pyrazinyl, pyrazolyl, imidozolyl, furanyl, thiophenyl, pyrrolyl, isoxazolyl, and oxazolyl.

The following preparation and examples serve to further illustrate the present invention.

PREPARATION 1 o-Aminobenzoic acid (2.75 grams) is dissolved in 10 ml. of trifluoroacetic anhydride and kept at 55°C for two hours. After evaporating to dryness, the residue is dissolved in 25 ml. of dimethylformamide, and 1.1 g. of sodium hydride and 1.5 ml. of methyl iodide are added. After stirring at 45°C for three hours, the mixture is cooled, acidified and the precipitate filtered off and washed. This trifluoroacetyl derivative is then refluxed in 50 ml. of ethanol containing 5 ml. of 2N sodium hydroxide solution for 30 minutes. After cooling, the reaction mixture is acidified and filtered to give o-(methylamino)-benzoic acid.

In like manner, p-(methylamino)-benzoic acid and N-methylaniline are prepared from p-aminobenzoic acid and aniline, respectively. In like manner, the corresponding three series of amino compounds containing each of the following N-alkyl groups are prepared using the appropriate alkyl bromide: ethyl, n-propyl, isopropyl, n-butyl, isobutyl, sec-butyl, t-butyl, and n-pentyl.

Similarly, the corresponding N-alkyl amino compounds further ring substituted are prepared, e.g. o-methylamino-p-methylbenzoic acid, o-methylamino-p-methoxybenzoic acid, P-methyl-N-methylaniline, p-methoxy-N-methylaniline, and so forth.

EXAMPLE 1

A mixture of 2.1 grams of 4-bromobenzoic acid, 1.65 g. of o-aminobenzoic acid, 0.25 g. of copper powder and 3.5 g. of anhydrous potassium carbonate in 25 ml. of dimethylformamide is heated to 160°C and maintained thereat with stirring and under a nitrogen atmosphere. After monitoring via tlc indicates the reaction is substantiallly complete, the reaction mixture is diluted with water, treated with charcoal, filtered and the clear filtrate acidified. The precipitate is isolated by suction filtration, washed neutral and dried to give 4-(2-carboxyphenylamino)-benzoic acid.

2.35 g. of 4-(2-carboxylphenylamino)-benzoic acid in 40 ml. of concentrated sulfuric acid is stirred at 25°C for 16 hours. After this time, the reaction mixture is poured into 200 ml. of ice water and the resultant mixture is heated on a steam bath for 15 minutes. The mixture is cooled and filtered with the precipitate being washed with water and then recrystallized from acetic acid to give acridone-2-carboxylic acid.

EXAMPLE 2

A mixture of 3.52 grams of 4-methylaminobenzoic acid, 4.35 g. of o-bromobenzoic acid, 0.4 g. of copper powder and 7.5 g. of anhydrous potassium carbonate in 40 ml. of dimethylformamide is heated to 160°C and maintained thereat with stirring and under a nitrogen atmosphere. After monitoring via tlc indicates the reaction is substantially complete, the reaction mixture is diluted with water, treated with charcoal, filtered and the clear filtrate acidified. The precipitate is isolated by suction filtration, washed neutral and dried to give 4-(2-carboxyphenyl-N-methylamino)-benzoic acid.

5.3 g. of 4-(2-carboxyphenyl-N-methylamino)-benzoic acid in 60 ml. of concentrated sulfuric acid is stirred at 25°C for 18 hours. After this time, the reaction mixture is poured into 200 ml. of ice water and the resultant mixture is heated on a steam bath for 15 minutes. The mixture is cooled and filtered with the precipitate being washed with water and then recrystallized from acetic acid to give N-methylacridone-2-carboxylic acid.

EXAMPLE 3

A mixture of 4.9 grams of 1,3-dicarboxy-4-bromobenzene, 6.5 g. of p-methylaniline, 0.5 g. of copper powder and 8.25 g. of anhydrous potassium carbonate in 50 ml. of dimethylformamide is heated to 160°C and maintained thereat with stirring and under a nitrogen atmosphere. After monitoring via tlc indicates the reaction is substantially complete, the reaction mixture is diluted with water, treated with charcoal, filtered and the clear filtrate acidified. The precipitate is isolated by suction filtration, washed neutral and dried to give 1,3-dicarboxy-4-(p-methylamino)-phenylbenzene.

4.8 grams of 1,3-dicarboxy-4-(p-methylamino)-phenylbenzene in 60 ml. of concentrated sulfuric acid is stirred at 25°C for 16 hours. After this time, the reaction mixture is poured into 200 ml. of ice water and the resultant mixture is heated on a steam bath for 15 minutes. The mixture is cooled and filtered with the precipitate being washed with water and then recrystallized from acetic acid to give 7-methylacridone-2-carboxylic acid.

EXAMPLE 4

The procedures of Examples 1, 2 and 3 are repeated using the appropriate N- and/or p-substituted-o-aminobenzoic acid (Paragraph 1 of Example 1), -o-bromobenzoic acid and/or p-aminobenzoic acid (Paragraph 1 of Example 2), and -aniline (Paragraph 1 of Example 3) to furnish the following substituted acridone-2-carboxylic acid products:

7-methylacridone-2-carboxylic acid,
7-ethylacridone-2-carboxylic acid,
7-n-propylacridone-2-carboxylic acid,
7-isopropylacridone-2-carboxylic acid,
7-n-butylacridone-2-carboxylic acid,
7-isobutylacridone-2-carboxylic acid,
7-sec-butylacridone-2-carboxylic acid,
7-t-butylacridone-2-carboxylic acid,
7-pentylacridone-2-carboxylic acid,
7-cyclopropylacridone-2-carboxylic acid,
7-cyclobutylacridone-2-carboxylic acid,
7-cyclopentylacridone-2-carboxylic acid,
7-methoxyacridone-2-carboxylic acid,
7-ethoxyacridone-2-carboxylic acid,
7-n-propoxyacridone-2-carboxylic acid,
7-isopropoxyacridone-2-carboxylic acid,
7-n-butoxyacridone-2-carboxylic acid,
7-isobutoxyacridone-2-carboxylic acid,
7-sec-butoxyacridone-2-carboxylic acid,
7-t-butoxyacridone-2-carboxylic acid,
7-pentoxyacridone-2-carboxylic acid,
7-cyclopropoxyacridone-2-carboxylic acid,
7-cyclobutoxyacridone-2-carboxylic acid,
7-cyclopentoxyacridone-2-carboxylic acid,
7-hydroxyacridone-2-carboxylic acid,
7-mercaptoacridone-2-carboxylic acid,
7-methylthioacridone-2-carboxylic acid,
7-ethylthioacridone-2-carboxylic acid,
7-n-propylthioacridone-2-carboxylic acid,
7-isopropylthioacridone-2-carboxylic acid,
7-n-butylthioacridone-2-carboxylic acid,
7-isobutylthioacridone-2-carboxylic acid,
7-sec-butylthioacridone-2-carboxylic acid,
7-t-butylthioacridone-2-carboxylic acid,
7-pentylthioacridone-2-carboxylic acid,
7-cyclopropylthioacridone-2-carboxylic acid,
7-cyclobutylthioacridone-2-carboxylic acid,
7-cyclopentylthioacridone-2-carboxylic acid,
7-trifluoromethylacridone-2-carboxylic acid,
7-acetylacridone-2-carboxylic acid,
7-propionylacridone-2-carboxylic acid,
7-n-butyrylacridone-2-carboxylic acid,
7-isobutyrylacridone-2-carboxylic acid,
7-n-pentanoylacridone-2-carboxylic acid,
7-isopentanoylacridone-2-carboxylic acid,
7-sec-pentanoylacridone-2-carboxylic acid,
7-t-pentanoylacridone-2-carboxylic acid,
7-n-hexanoylacridone-2-carboxylic acid,
7-n-heptanoylacridone-2-carboxylic acid,
7-n-octanoylacridone-2-carboxylic acid,
7-n-nonanoylacridone-2-carboxylic acid,
7-cyclopropylcarbonylacridone-2-carboxylic acid,
7-cyclobutylcarbonylacridone-2-carboxylic acid,
7-cyclopentylcarbonylacridone-2-carboxylic acid,
7-cyclohexylcarbonylacridone-2-carboxylic acid,
7-formylacridone-2-carboxylic acid,
7-chloroacridone-2-carboxylic acid,
7-fluoroacridone-2-carboxylic acid,
7-bromoacridone-2-carboxylic acid,
7-benzoylacridone-2-carboxylic acid,
7-p-chlorobenzoylacridone-2-carboxylic acid,
7-p-methylbenzoylacridone-2-carboxylic acid,
7-p-methoxybenzoylacridone-2-carboxylic acid,
7-p-thiomethoxybenzoylacridone-2-carboxylic acid,
7-furoylacridone-2-carboxylic acid,
7-pyrroylacridone-2-carboxylic acid,
7-thenoylacridone-2-carboxylic acid,
7-pyridylcarbonylacridone-2-carboxylic acid,
7-imidazolylcarbonylacridone-2-carboxylic acid, and 7-oxazolylcarbonylacridone-2-carboxylic acid, and the corresponding 70 compounds in each of the N-methyl, -ethyl, -n-propyl, -isopropyl, -n-butyl, -isobutyl, -sec-butyl, -t-butyl, and -pentyl series, i.e., N,7-dimethyl-acridone-2-carboxylic acid, N-methyl-7-ethylacridone-2-carboxylic acid, and so forth, N-ethyl-7-methylacridone-2-carboxylic acid, N-7-diethylacridone-2-carboxylic acid, and so forth, and N-n-propyl-7-methylacridone-2-carboxylic acid, N-n-propyl-7-ethylacridone-2-carboxylic acid, and so forth, as well as:

N-methylacridone-2-carboxylic acid,
N-ethylacridone-2-carboxylic acid,
N-n-propylacridone-2-carboxylic acid,
N-isopropylacridone-2-carboxylic acid,
N-n-butylacridone-2-carboxylic acid,
N-isobutylacridone-2-carboxylic acid,
N-sec-butylacridone-2-carboxylic acid,
N-t-butylacridone-2-carboxylic acid, and
N-pentylacridone-2-carboxylic acid.

EXAMPLE 5

Acridone-2-carboxylic acid (2.8 grams), 5.2 g. of potassium carbonate, and 5 ml. of methyl iodide in 60 ml. of dimethylformamide are stirred for 3 hours at 50°C.

After this period of time, dilute hypochloric acid is added and the precipitate is filtered off and washed with water. The crude N-methyl methyl ester is then refluxed for 30 minutes in 30 ml. of ethanol containing 5 ml. of 2N sodium hydroxide solution. After acidifying, the mixture is filtered to give N-methylacridone-2-carboxylic acid.

In like manner, the other N-loweralkylacridone-2-carboxylic acid products are prepared using the appropriate alkyl bromide reagent.

Thus prepared are the N-alkyl compounds otherwise corresponding to the first 70 products of Example 4, i.e., N,7-dimethylacridone-2-carboxylic acid,
N-methyl-7-ethylacridone-2-carboxylic acid,
N-methyl-7-n-propylacridone-2-carboxylic acid,
N-methyl-7-isopropylacridone-2-carboxylic acid, and
so forth, i.e., the N-ethyl, n-propyl, -isopropyl, etc. compounds,
N-methyl-7-methoxyacridone-2-carboxylic acid,
N-methyl-7-ethoxyacridone-2-carboxylic acid,
N-methyl-7-n-propoxyacridone-2-carboxylic acid,
N-methyl-7-isopropoxyacridone-2-carboxylic acid, and
so forth, i.e., the N-ethyl, -n-propyl, -isopropyl, etc. compounds,
N-methyl-7-methylthioacridone-2-carboxylic acid,
N-methyl-7-ethylthioacridone-2-carboxylic acid,
N-methyl-7-n-propylthioacridone-2-carboxylic acid, N-methyl-7-isopropylthioacridone-2-carboxylic acid, and so forth, i.e., the N-ethyl, -n-propyl, -isopropyl, etc. compounds,
N-methyl-7-acetylacridone-2-carboxylic acid,
N-methyl-7-propionylacridone-2-carboxylic acid,
and so forth, i.e., the N-ethyl, -n-propyl, -isopropyl, etc. compounds,
N-methyl-7-cyclopropylcarbonylacridone-2-carboxylic acid,
N-methyl-7-cyclobutylcarbonylacridone-2-carboxylic acid, and so forth, i.e. the N-ethyl, -n-propyl, -isopropyl, etc. compounds,
N-methyl-7-benzoylacridone-2-carboxylic acid,
N-methyl-7-furoylacridone-2-carboxylic acid,
N-methyl-7-pyrroylacridone-2-carboxylic acid,
N-methyl-7-thenoylacridone-2-carboxylic acid, and so forth, i.e., the N-ethyl, -n-propyl, -isopropyl, etc. compound.

Alternatively, the hydroxy compounds can be prepared from the lower alkoxy compounds of Example 4 according to the following representative procedure.

EXAMPLE 6

A mixture of 11 grams of 7-methoxyacridone-2-carboxylic acid in 100 ml. of concentrated aqueous hydrogen iodide and 100 ml. of acetic acid is refluxed for four hours. After this time, the mixture is cooled, diluted with water, and filtered. The precipitate is washed and dried to give 7-hydroxyacridone-2-carboxylic acid.

EXAMPLE 7

This example illustrates the manner by which the esters of the 7-hydroxyacridone-2-carboxylic acids are prepared.

A mixture of 2 grams of 7-hydroxyacridone-2-carboxylic acid in 8 ml. of pyridine and 4 ml. of acetyl chloride is heated at steam bath temperatures for one hour. The mixture is then poured into ice water and the solid which forms is collected by filtration, washed with water and dried to yield 7-acetoxyacridone-2-carboxylic acid which is further purified through recrystallizaton from acetic acid.

In a similar manner, N-methyl-7-acetylacridone-2-carboxylic acid is prepared.

Upon substitution of the appropriate alkanoyl chloride in the above procedures, the other 7-esters can be prepared, e.g., 7-propionyloxyacridone-2-carboxylic acid,
7-butyryloxyacridone-2-carboxylic acid,
7-trichloroacetoxyacridone-2-carboxylic acid,
7-trimethylacetoxyacridone-2-carboxylic acid,
7-heptanoyloxyacridone-2-carboxylic acid,
7-pentanoyloxyacridone-2-carboxylic acid,
7-2-chloropropionyloxyacridone-2-carboxylic acid, and so forth.

EXAMPLE 8

To a solution of two grams of acridone-2-carboxylic acid in 200 ml. of triethylene glycol are added 2 g. of potassium hydroxide and 2 g. of 95 percent hydrazine. The resultant mixture is heated to reflux (155°C) and maintained thereat for 1 hour. The distillate is removed and the temperature is held at a temperature of about 200°C for 2 hours. The mixture is then cooled to 68°C and 200 ml. of water is added and the resultant solution poured into 110 ml. of water containing 60 ml. of concentrated hydrochloric acid. The resultant mixture is heated to 90°C, cooled to room temperature and filtered to give acridine-2-carboxylic acid.

Alternatively, the reduction is conducted as follows:

Two grams of acridone-2-carboxylic acid and 1 g. of sodium are refluxed in 20 ml. of iso-amyl alcohol for 30 minutes. After cooling, 10 ml. of water are added cautiously and the mixture is steam distilled to remove the iso-amyl alcohol. The residue is acidified and filtered to give acridine-2-carboxylic acid.

Twenty-six grams of acridine-2-carboxylic acid is added to 400 ml. of absolute methanol. To the resultant solution are added 18 ml. of concentrated sulfuric acid and the mixture is then heated at reflux for about 2 hours. The mixture is then cooled to 40°C and sufficient water is added to bring the total volume to 1,400 ml. The resultant mixture is then filtered to give methyl acridine-2-carboxylate.

A mixture of 4.2 g. of methyl acridine-2-carboxylate in 200 ml. of dichloroethane is cooled to −5°C and to the cooled solution are added 1.8 ml. of acetyl chloride and then 5.4 g. of aluminum trichloride. The resultant solution is stirred at room temperature for 1.75 hours. After this time, the solution is poured into a mixture of 300 g. of ice, 700 ml. of water, and 20 ml. of concentrated hydrochloric acid. The mixture is then extracted with three 500 ml. portions of methylene chloride. The combined extracts are washed with 10 percent aqueous potassium hydroxide solution and the washed solution evaporated to give methyl 7-acetylacridine-2-carboxylate.

To a solution of 3.75 g. of methyl 7-acetylacridine-2-carboxylate in 120 ml. of acetone and 15 ml. of dimethylformamide are added 0.5 g. of magnesium sulfate and 8.2 ml. of 8N chromic acid in 8N sulfuric acid. The resultant mixture is stirred at room temperature for 50 minutes after which time a solution of 4 g. of sodium bisulfite in 20 ml. of water is added. After this time, 250 ml. of water and 25 ml. of sulfuric acid:water (1:1) are added. The mixture is stripped of solvent and filtered. The precipitate is washed with 50 ml. of water to give methyl 7-acetylacridone-2-carboxylate which is recrystallized from methanol (displacement from methylene chloride solution).

A solution of 2 g. of methyl 7-acetylacridone-2-carboxylate in 200 ml. of 10 percent aqueous, 10 percent potassium hydroxide in methanol is heated at reflux under a nitrogen atmosphere for 45 minutes. After this time, 20 Ml. of water are added and the resultant mixture heated at reflux for 35 minutes. Water (300 ml.) is then added and the resultant mixture acidified and filtered to give 7-acetyl-acridone-2-carboxylic acid.

N-methyl-7-acetylacridone-2-carboxylic acid is also thus prepared.

Alternatively, the 7-acylacridone-2-carboxylic acids can be prepared according to the following representative procedure.

p-(o-Carboxyanilino)-benzoic acid (8.35 g.) is refluxed in 30 ml. of phosphorous oxychloride for two hours. The reaction mixture is then cooled, poured on ice and the resulting suspension is warmed on the steam bath. The precipitate is filtered off and washed with water to give 9-chloroacridine-2-carboxylic acid.

The thus obtained compound is treated according to the procedure of Paragraph 4 of this Example to give 7-acetyl-9-chloroacridine-2-carboxylic acid.

6.35 g. of 7-Acetyl-9-chloroacridine-2-carboxylic acid and 3.6 g. of potassium hydroxide are refluxed in 120 ml. of ethanol containing 20 ml. of water for six hours. The resulting dark solution is treated with charcoal (15 minutes reflux), filtered through celite and acidified. The precipitate is isolated by suction filtration and washed with water to give 7-acetylacridone-2-carboxylic acid.

EXAMPLE 9

The procedure of Example 8 is repeated employing, in the procedure of the third paragraph thereof, the acyl chlorides (prepared from the corresponding acids upon treatment with thionyl chloride or oxalyl chloride) listed in Column A below to prepare the corresponding acid products listed in Column B below, through their respective methyl esters.

| Column A | Column B |
| --- | --- |
| propionyl chloride | 7-propionylacridone-2-carboxylic acid |
| N-butyryl chloride | 7-n-butyrylacridone-2-carboxylic acid |
| isobutyryl chloride | 7-isobutyrylacridone-2-carboxylic acid |
| n-pentanoyl chloride | 7-n-pentanoylacridone-2-carboxylic acid |
| isopentanoyl chloride | 7-isopentanoylacridone-2-carboxylic acid |
| sec-pentanoyl chloride | 7-sec-pentanoylacridone-2-carboxylic acid |
| t-pentanoyl chloride | 7-t-pentanoylacridone-2-carboxylic acid |
| n-hexanoyl chloride | 7-n-hexanoylacridone-2-carboxylic acid |
| n-heptanoyl chloride | 7-n-heptanoylacridone-2-carboxylic acid |
| n-octanoyl chloride | 7-n-octanoylacridone-2-carboxylic acid |
| n-nonanoyl chloride | 7-n-nonanoylacridone-2-carboxylic acid |
| cyclopropylcarbonyl chloride | 7-cyclopropylcarbonylacridone-2-carboxylic acid |
| cyclobutylcarbonyl chloride | 7-cyclobutylcarbonylacridone-2-carboxylic acid |
| cyclopentylcarbonyl chloride | 7-cyclopentylcarbonylacridone-2-carboxylic acid |
| cyclohexylcarbonyl chloride | 7-cyclohexylcarbonylacridone-2-carboxylic acid |
| benzoyl chloride | 7-benzoylacridone-2-carboxylic acid |
| p-chlorobenzoyl chloride | 7-p-chlorobenzoylacridone-2-carboxylic acid |
| p-methylbenzoyl chloride | 7-p-methylbenzoylacridone-2-carboxylic acid |
| p-methoxybenzoyl chloride | 7-p-methoxybenzoylacridone-2-carboxylic acid |
| p-thiomethoxybenzoyl chloride | 7-p-thiomethoxybenzoylacridone-2-carboxylic acid |
| furoyl chloride | 7-furoylacridone-2-carboxylic acid |
| pyrroyl chloride | 7-pyrroylacridone-2-carboxylic acid |
| thenoyl chloride | 7-thenoylacridone-2-carboxylic acid |
| pyridylcarbonyl chloride | 7-pyridylcarbonylacridone-2-carboxylic acid |
| imidazolylcarbonyl | 7-imidazolylcarbonylacridone-2-carboxylic acid |
| oxazolylcarbonyl chloride | 7-oxazolylcarbonylacridone-2-carboxylic acid | and the N-methyl compounds corresponding to the compounds of Column B.

The foregoing is practiced using the corresponding acyl bromide starting compounds, with similar results.

EXAMPLE 10

A mixture of 1.8 grams of methyl 7-acetylacridone-2-carboxylate, 450 mg. of sodium borohydride and 150 ml. of tetrahydrofuran is stirred for 2.5 hours at room temperature. The reaction is monitored by tlc. After this period of time, a 5 percent aqueous acetic acid solution is added to the reaction mixture dropwise to neutrality and the resultant solution evaporated under vacuum and crystallized by the addition of ethanol and hot water. The precipitate is filtered off, washed and dried to give methyl 7-(1-hydroxyethyl)-acridone-2-carboxylate.

A mixture of 1.25 mg. of methyl 7-(1-hydroxyethyl)-acridone- 2-carboxylate, 60 ml. of ethanol and 2 ml. of 2N sodium hydroxide is refluxed for 30 minutes. The resultant mixture is cooled, acidified and the precipitate is filtered off, washed, and dried to give 7-(1-hydroxyethyl)-acridone-2-carboxylic acid.

N-methyl-7-(1-hydroxyethyl)-acridone-2-carboxylic acid is also thus prepared.

The foregoing procedures are practiced upon the other 7-acyl methyl esters prepared as described in Example 9 to give the following products, through their respective methyl esters:

7-(1-hydroxy-n-propyl)-acridone-2-carboxylic acid,
7-(1-hydroxy-n-butyl)-acridone-2-carboxylic acid,
7-(1-hydroxyisobutyl)-acridone-2-carboxylic acid,
7-(1-hydroxy-n-pentyl)- acridone-2-carboxylic acid, 7-(1-hydroxy-isopentyl)-acridone-2-carboxylic acid, 7-(1-hydroxy-sec-pentyl)-acridone-2-carboxylic acid, 7-(1-hydroxy-t-pentyl)-acridone-2-carboxylic acid,
7-(1-hydroxy-n-hexyl)-acridone-2-carboxylic acid,
7-(1-hydroxy-n-heptyl)-acridone-2-carboxylic acid,
7-(1-hydroxy-n-octyl)-acridone-2-carboxylic acid,
7-(1-hydroxy-n-nonyl)-acridone-2-carboxylic acid,
7-((cycloproyl)hydroxymethyl)-acridone-2-carboxylic acid,
7-((cyclobutyl)hydroxymethyl)-acridone-2-carboxylic acid,
7-((cyclopentyl)hydroxymethyl)-acridone-2-carboxylic acid,
7-((cyclohexyl)hydroxymethyl)-acridone-2-carboxylic acid,
7-((phenyl)hydroxymethyl)-acridone-2-carboxylic acid,
7-((p-chlorophenyl)hydroxymethyl)-acridone-2-carboxylic acid,
7-((p-methylphenyl)hydroxymethyl)-acridone-2-carboxylic acid,
7-((p-methoxyphenyl)hydroxymethyl)-acridone-2-carboxylic acid,
7-((p-thiomethoxyphenyl)hydroxymethyl)-acridone-2-carboxylic acid,
7-((furyl)hydroxymethyl)-acridone-2-carboxylic acid,
7-((pyrryl)hydroxymethyl)-acridone-2-carboxylic acid,
7-((thienyl)hydroxymethyl)-acridone-2-carboxylic acid,
7-((pyridyl)hydroxymethyl)-acridone-2-carboxylic acid,
7-((imidazolyl)hydroxymethyl)-acridone-2-carboxylic acid,
7-((oxazolyl)hydroxymethyl)-acridone-2-carboxylic acid, and so forth.

Also thus prepared are the N-alkyl compounds otherwise corresponding to the above, i.e. N-methyl-7-(1-hydroxy-n-propyl)-acridone-2-carboxylic acid, N-methyl-7-(1-hydroxy-n-butyl)-acridone-2-carboxylic acid, and so forth.

EXAMPLE 11

A solution of 2.95 grams of methyl 7-acetylacridone-2-carboxylate in 120 ml. of tetrahydrofuran is stirred at 0°C and 3.3 ml. of 3M methylmagnesium bromide solution in ether are added dropwise. After stirring at 0°C for 30 minutes, the reaction mixture is left to warm up to room temperature. A saturated ammonium chloride solution (50 ml.) is then added and the mixture is concentrated in vacuo. Extraction with ethyl acetate followed by evaporation yields methyl 7-(1-hydroxy-1-methylethyl)-acridone-2-carboxylate.

Hydrolysis as described in Example 10 affords 7-(1-hydroxy-1-methylethyl)-acridone-2-carboxylic acid.

The foregoing procedure is practiced upon the other 7-acyl methyl esters prepared as described in Example 9 to give the following products, through their respective methyl esters:
7-(1-hydroxy-1-methyl-n-propyl)-acridone-2-carboxylic acid,
7-(1-hydroxy-1-methyl-n-butyl)-acridone-2-carboxylic acid,
7-(1-hydroxy-1-methyl-isobutyl)-acridone-2-carboxylic acid,
7-(1-hydroxy-1-methyl-n-pentyl)-acridone-2-carboxylic acid,
7-(1-hydroxy-1-methyl-isopentyl)-acridone-2-carboxylic acid,
7-(1-hydroxy-1-methyl-sec-pentyl)-acridone-2-carboxylic acid,
7-(1-hydroxy-1-methyl-t-pentyl)-acridone-2-carboxylic acid,
7-(1-hydroxy-1-methyl-n-hexyl)-acridone-2-carboxylic acid,
7-(1-hydroxy-1-methyl-n-heptyl)-acridone-2-carboxylic acid,
7-(1-hydroxy-1-methyl-n-octyl)-acridone-2-carboxylic acid,
7-(1-hydroxy-1-methyl-n-nonyl)-acridone-2-carboxylic acid,
7-(1-hydroxy-1-cyclopropylethyl)-acridone-2-carboxylic acid,
7-(1-hydroxy-1-cyclobutylethyl)-acridone-2-carboxylic acid,
7-(1-hydroxy-1-cyclopentylethyl)-acridone-2-carboxylic acid,
7-(1-hydroxy-1-cyclohexylethyl)-acridone-2-carboxylic acid,
7-(1-hydroxy-1-phenylethyl)-acridone-2-carboxylic acid,
7-(1-hydroxy-1-p-chlorophenylethyl)-acridone-2-carboxylic acid,
7-(1-hydroxy-1-p-methylphenylethyl)-acridone-2-carboxylic acid,
7-(1-hydroxy-1-p-methoxyphenylethyl)-acridone-2-carboxylic acid,
7-(1-hydroxy-1-p-thiomethoxyphenylethyl)-acridone-2-carboxylic acid,
7-(1-hydroxy-1-furylethyl)-acridone-2-carboxylic acid,
7-(1-hydroxy-1-pyrrylethyl)-acridone-2-carboxylic acid,
7-(1-hydroxy-1-thienylethyl)-acridone-2-carboxylic acid,
7-(1-hydroxy-1-pyridylethyl)-acridone-2-carboxylic acid.
7-(1-hydroxy-1-imidazolylethyl)-acridone-2-carboxylic acid,
7-(1-hydroxy-1-oxazolylethyl)-acridone-2-carboxylic acid,
and the N-alkyl compounds otherwise corresponding thereto, i.e., N-methyl 7-(1-hydroxy-1-methylethyl)-acridone-2-carboxylic acid, N-methyl 7-(1-hydroxy-1-methyl-n-propyl)-acridone-2-carboxylic acid, and so forth.

EXAMPLE 12

The procedure of Example 11 is repeated employing, in lieu of methyl magnesium bromide, the reagents listed in Column C below to prepare the products listed in Column D below:

| Column C | Column D |
| --- | --- |
| ethylmagnesium bromide | 7-(1-hydroxy-1-ethylethyl)-acridone-2-carboxylic acid |
| | 7-(1-hydroxy-1-ethyl-n-propyl)-acridone-2-carboxylic acid, and so forth |
| n-propylmagnesium bromide | 7-(1-hydroxy-1-n-propylethyl)-acridone-2-carboxylic acid |
| | 7-(1-hydroxy-1-n-propyl-n-propyl)-acridone-2-carboxylic acid, and so forth |
| isopropylmagnesium bromide | 7-(1-hydroxy-1-isopropylethyl)-acridone-2-carboxylic acid |
| | 7-(1-hydroxy-1-isopropyl-n-propyl)-acridone-2-carboxylic acid, and so forth |
| n-butylmagnesium bromide | 7-(1-hydroxy-1-n-butylethyl)-acridone-2-carboxylic acid |
| | 7-(1-hydroxy-1-n-butyl-n-propyl)-acridone-2-carboxylic acid, and so forth, |

| Column C | Column D |
|---|---|
| isobutylmagnesium bromide | 7-(1-hydroxy-1-isobutylethyl)-acridone-2-carboxylic acid<br>7-(1-hydroxy-1-isobutyl-n-propyl)-acridone-2-carboxylic acid, and so forth |
| sec-butylmagnesium bromide | 7-(1-hydroxy-1-sec-butylethyl)-acridone-2-carboxylic acid<br>7-(1-hydroxy-1-sec-butyl-n-propyl)-acridone-2-carboxylic acid, and so forth |
| t-butylmagnesium bromide | 7-(1-hydroxy-1-t-butylethyl)-acridone-2-carboxylic acid<br>7-(1-hydroxy-1-t-butyl-n-propyl)-acridone-2-carboxylic acid, and so forth |
| n-pentylmagnesium bromide | 7-(1-hydroxy-1-n-pentylethyl)-acridone-2-carboxylic acid<br>7-(1-hydroxy-1-n-pentyl-n-propyl)-acridone-2-carboxylic acid, and so forth |
| hexylmagnesium bromide | 7-(1-hydroxy-1-hexylethyl)-acridone-2-carboxylic acid<br>7-(1-hydroxy-1-hexyl-n-propyl)-acridone-2-carboxylic acid, and so forth |
| heptylmagnesium bromide | 7-(1-hydroxy-1-heptylethyl)-acridone-2-carboxylic acid<br>7-(1-hydroxy-1-heptyl-n-propyl)-acridone-2-carboxylic acid, and so forth |
| octylmagnesium bromide | 7-(1-hydroxy-1-octylethyl)-acridone-2-carboxylic acid<br>7-(1-hydroxy-1-octyl-n-propyl)-acridone-2-carboxylic acid, and so forth |
| cyclopropylmagnesium bromide | 7-(1-hydroxy-1-cyclopropylethyl)-acridone-2-carboxylic acid<br>7-(1-hydroxy-1-cyclopropyl-n-propyl)-acridone-2-carboxylic acid, and so forth |
| cyclobutylmagnesium bromide | 7-(1-hydroxy-1-cyclobutylethyl)-acridone-2-carboxylic acid<br>7-(1-hydroxy-1-cyclobutyl-n-propyl)-acridone-2-carboxylic acid, and so forth |
| cyclopentylmagnesium bromide | 7-(1-hydroxy-1-cyclopentylethyl)-acridone-2-carboxylic acid<br>7-(1-hydroxy-1-cyclopentyl-n-propyl)-acridone-2-carboxylic acid, and so forth |
| cyclohexylmagnesium bromide | 7-(1-hydroxy-1-cyclohexylethyl)-acridone-2-carboxylic acid<br>7-(1-hydroxy-1-cyclohexyl-n-propyl)-acridone-2-carboxylic acid, and so forth | and the N-alkyl compounds otherwise corresponding thereto, i.e. N-methyl 7-(1-hydroxy-1-ethylethyl)-acridone-2-carboxylic acid, N-methyl 7-(1-hydroxy-1-ethyl-n-propyl)-acridone-2-carboxylic acid, and so forth.

EXAMPLE 13

A mixture of 4.1 grams of 7-hydroxyacridone-2-carboxylic acid, 10 g. of methyl iodide, and 8.5 g. of lithium carbonate in 50 ml. of dimethylformamide is stirred at room temperature for a period of 16 hours. After this period of time, the reaction mixture is poured into dilute hydrochloric acid-ice and the resultant mixture extracted with ethyl acetate. The extracts are filtered through alumina to give methyl 7-hydroxyacridone-2-carboxylate which can be recrystallized from methanol.

To a solution of 7.5 g. of methyl 7-hydroxyacridone-2-carboxylate in 100 ml. of dimethylformamide are added 1.2 g. of sodium hydride. The mixture is stirred for ten minutes at room temperature under nitrogen. Dimethylthiocarbamoyl chloride (3 g.) is then added thereto and the resultant mixture stirred at 70°C for 6 hours and then at room temperature for 16 hours. The mixture is then poured into 200 ml. of water containing 1 ml. of acetic acid, the resultant mixture is filtered and the solid dried to give methyl 7-(dimethylthiocarbamoyloxy)-acridone-2-carboxylate.

Methyl 7-(dimethylthiocarbamoyloxy)-acridone-2-carboxylate (8.4 g.) in 150 ml. of sulfolane is stirred at 230°C under nitrogen. After a total of 6 hours under these conditions, tlc indicates the absence of starting material. The mixture is cooled to 80°C and 150 ml. of hot water are slowly added. The mixture is then cooled and the filtered solid washed with water and dried to give methyl 7-(dimethyl-carbamoylthio)-acridone-2-carboxylate.

Methyl 7-(dimethylcarbamoylthio)-acridone-2-carboxylate (6.9 g.), 2.5 g. of potassium hydroxide and 250 ml. of 80 percent aqueous ethanol is refluxed for one hour. After this time, 250 ml. of water are added and the mixture is treated with charcoal, filtered, and acidified. The product is filtered off and dried to give 7-(mercapto)-acridone-2-carboxylic acid.

In like manner, N-methyl-7-mercaptoacridone-2-carboxylic acid is prepared.

EXAMPLE 14

A mixture of 5.7 grams of 7-mercaptoacridone-2-carboxylic acid in 150 ml. of dimethylformamide, 10 ml. of methyl iodide and 10 g. of lithium carbonate is stirred for 16 hours at 60°C. The mixture is then poured into dilute hydrochloric acid and the resultant mixture extracted with ethyl acetate. The extracts are chromatographed on alumina (methylene chloride) to give methyl 7-methylthioacridone-2-carboxylate which can be recrystallized from methylene chloride:methanol.

A mixture of 820 mg. of methyl 7-methylthioacridone-2-carboxylate, 30 ml. of ethanol, 5 ml. of saturated sodium carbonate solution and 5 ml. of water is refluxed for 1 hour. The mixture is then cooled, acidified and the precipitate filtered off to give 7-methylthioacridone-2-carboxylic acid as also prepared in the alternative method described above.

A mixture of 1.2 g. of 7-mercaptoacridone-2-carboxylic acid, 2 ml. of 2-bromopropane, and excess lithium carbonate in 50 ml. of dimethylformamide is stirred for 24 hours at 75°C. Dilute hydrochloric acid and ethanol are added, the solid filtered off and washed. The solid is saponified with sodium carbonate in aqueous methanol (30 minutes reflux). The alkaline solution is diluted with water, treated with charcoal, filtered, and acidified to give 7-isopropylthioacridone-2-carboxylic acid which can be recrystallized from tetrahydrofuran:ethyl acetate.

In a similar manner (and alternative to the method of Example 1), the following are prepared from the respective starting compounds:

7-ethylthioacridone-2-carboxylic acid,
7-n-propylthioacridone-2-carboxylic acid,
7-n-butylthioacridone-2-carboxylic acid,
7-sec-butylthioacridone-2-carboxylic acid,
7-isobutylthioacridone-2-carboxylic acid,
7-t-butylthioacridone-2-carboxylic acid,
7-n-pentylthioacridone-2-carboxylic acid,
and the N-alkyl compounds thereof, i.e. N-methyl 7-(methyl thio)-acridone-2-carboxylic acid, N-methyl 7-(isopropylthio)-acridone-2-carboxylic acid, N-methyl 7-(ethylthio)-acridone-2-carboxylic acid, and so forth.

EXAMPLE 15

A solution of 2.6 g. of methyl 7-methylthioacridone2-carboxylate in 80 ml. of acetic acid containing 2 ml. of 30 percent hydrogen peroxide is warmed on a steam bath for 30 minutes. One hundred milliliters of hot water are then added and the mixture is cooled. The crystalline precipitate of methyl 7-methylsulfonylacridone-2-carboxylate is filtered off and washed with water.

Methyl 7-methylsulfonylacridone-2-carboxylate is saponified by the procedure of Example 13 to give 7-methylsulfonylacridone-2-carboxylic acid.

In like manner, the N-alkyl 7-methylsulfonylacridone-2-carboxylic acids are prepared.

Likewise, from the respective starting compounds are prepared the following compounds:

7-isopropylsulfonylacridone-2-carboxylic acid,
7-ethylsulfonylacridone-2-carboxylic acid,
7-n-propylsulfonylacridone-2-carboxylic acid,
7-n-butylsulfonylacridone-2-carboxylic acid,
7-sec-butylsulfonylacridone-2-carboxylic acid,
7-isobutylsulfonylacridone-2-carboxylic acid,
7-t-butylsulfonylacridone-2-carboxylic acid,
7-n-pentylsulfonylacridone-2-carboxylic acid, and the N-alkyl compounds thereof, i.e. N-methyl 7-(isopropylsulfonyl)-acridone-2-carboxylic acid, N-methyl 7-(ethylsulfonyl)-acridone-2-carboxylic acid, N-methyl 7-(n-propylsulfonyl)-acridone-2-carboxylic acid, and so forth.

EXAMPLE 16

Methyl 7-methylthioacridone-2-carboxylate (850 mg.) in 60 ml. of methylene chloride is cooled to 0°C (ice). m-Chloroperbenzoic acid (580 mg.) is then added and the mixture is stirred at 0°C for 75 minutes. The reaction mixture is then filtered through alumina and washed with methylene chloride to give methyl 7-methylsulfinylacridone-2-carboxylate which can be recrystallized from benzene:heptane.

Methyl 7-methylsulfinylacridone-2-carboxylate (820 mg.), 75 ml. of ethanol, and 10 ml. of 5 percent sodium hydroxide are refluxed for 30 minutes. The mixture is cooled, partially evaporated and acidified. The precipitate is filtered off, washed and dried to give 7-methylsulfinylacridone-2-carboxylic acid which can be recrystallized from acetic acid.

In like manner, the N-alkyl-7-(methylsulfinyl)acridone-2-carboxylic acids are prepared.

Likewise, from the respective starting compounds are prepared the following compounds:

7-isopropylsulfinylacridone-2-carboxylic acid,
7-ethylsulfinylacridone-2-carboxylic acid,
7-n-propylsulfinylacridone-2-carboxylic acid,
7-n-butylsulfinylacridone-2-carboxylic acid,
7-sec-butylsulfinylacridone-2-carboxylic acid,
7-isobutylsulfinylacridone-2-carboxylic acid,
7-t-butylsulfinylacridone-2-carboxylic acid,
7-n-pentylsulfinylacridone-2-carboxylic acid, and the N-alkyl compounds thereof, i.e., N-methyl-7-(isopropylsulfinyl)-acridone-2-carboxylic acid, N-methyl-7-(methylsulfinyl)-acridone-2-carboxylic acid, N-methyl-7-(n-propylsulfinyl)-acridone-2-carboxylic acid, and so forth.

The procedures of Examples 15 and 16 can be practiced upon the corresponding acid starting compounds to give the same products without the need of the hydrolysis step.

EXAMPLE 17

One gram of 7-mercaptoacridone-2-carboxylic acid is dissolved in 30 ml. of acetic acid containing 3 ml. of concentrated hydrochloric acid under warming. The solution is then saturated with chlorine gas and stirred at room temperature overnight. The solution is then diluted with water and the precipitate filtered off, washed, and dried to give 7-chlorosulfonylacridone-2-carboxylic acid.

Likewise, the N-alkyl-7-(chlorosulfonyl)-acridone-2-carboxylic acids are prepared.

The thus prepared chlorosulfonyl compounds are then treated with aqueous potassium hydroxide followed by acidification to give 7-sulfoacridone-2-carboxylic acid and the N-alkyl compounds otherwise corresponding thereto.

EXAMPLE 18

A mixture of 1 gram of 7-chlorosulfonylacridone-2-carboxylic acid, 2 ml. of concentrated aqueous ammonia, and 20 ml. of dioxane is stirred at room temperature overnight. The mixture is then diluted with water and the solid filtered off and dried to give 7-sulfamoylacridone-2-carboxylic acid.

In like manner, the N-alkyl-7-sulfamoylacridone-2-carboxylic acids are prepared.

Upon substituting a primary amine, such as methylamine and ethylamine, or a secondary amine, such as dimethylamine and diethylamine, for ammonia in the above method, the corresponding C-7 N-monolower alkylsulfamoyl and N,N-dilower alkylsulfamoyl products are obtained, e.g., 7-methylsulfamoylacridone-2-carboxylic acid,
7-ethylsulfamoylacridone-2-carboxylic acid,
7-n-propylsulfamoylacridone-2-carboxylic acid,
7-isopropylsulfamoylacridone-2-carboxylic acid,
7-dimethylsulfamoylacridone-2-carboxylic acid,
7-diethylsulfamoylacridone-2-carboxylic acid,
7-di-n-propylsulfamoylacridone-2-carboxylic acid,
7-di-isopropylsulfamoylacridone-2-carboxylic acid,
and so forth, and the N-alkyl compounds thereof, i.e. N-methyl 7-(methylsulfamoyl)-acridone-2-carboxylic acid, N-methyl 7-(ethylsulfamoyl)-acridone-2-carboxylic acid, N-methyl 7-(n-propylsulfamoyl)-acridone-2-carboxylic acid, and so forth.

EXAMPLE 19

A mixture of 2.8 grams of N-methylacridone-2-carboxylic acid, 3.2g. of methyl iodide, and 4.5 g. of lithium carbonate in 75 ml. of dimethylformamide is stirred at room temperature for a period of 18 hours. After this period of time, the reaction mixture is poured into dilute hydrochloric acid-ice and the resultant precipitate is filtered off and washed to give methyl N-methylacridone-2-carboxylate.

The foregoing procedure is repeated using the alternate lower alkyl iodides so as to prepare the corresponding lower alkyl acid esters hereof, e.g.:

ethyl N-methylacridone-2-carboxylate,
n-propyl N-methylacridone-2-carboxylate,
isopropyl N-methylacridone-2-carboxylate,
n-butyl N-methylacridone-2-carboxylate,
isobutyl N-methylacridone-2-carboxylate,
sec-butyl N-methylacridone-2-carboxylate,
n-pentyl N-methylacridone-2-carboxylate, and so forth.

In like manner, the other acridone-2-carboxylic acids including those containing substituents at the C-7 position, prepared as described above, can be converted to the corresponding acid esters, e.g. methyl 7-methylacridone-2-carboxylate, ethyl 7-isopropylacridone-2-carboxylate, and so forth.

EXAMPLE 20

To a solution of 10 grams of 7-isopropoxyacridone-2-carboxylic acid in 200 ml. of ethanol is added the theoretical amount of sodium hydroxide dissolved in 200 ml. of 90 percent ethanol. The reaction mixture is then concentrated in vacuum to give sodium 7-isopropoxyacridone-2-carboxylate.

Sodium N-methylacridone-2-carboxylic acid is also thus prepared.

In a similar manner, the potassium and lithium salts are prepared. Similarly, by replacing the sodium salt by means of an appropriate metal salt reagent, e.g., calcium chloride, manganese chloride and so forth, the other acridone-2-carboxylic acid salts are prepared, e.g.:

magnesium 7-isopropoxyacridone-2-carboxylate,
calcium 7-isopropoxyacridone-2-carboxylate,
aluminum 7-isopropoxyacridone-2-carboxylate,
ferrous 7-isopropoxyacridone-2-carboxylate,
zinc 7-isopropoxyacridone-2-carboxylate,
manganese 7-isopropoxyacridone-2-carboxylate,
ferric 7-isopropoxyacridone-2-carboxylate, and so forth.

In a similar manner, the acridone-2-carboxylic acid salts of the other C-7 and/or N-substituted acridone-2-carboxylic acids hereof are prepared.

EXAMPLE 21

To a mixture of 50 milliliters of concentrated aqueous ammonia in 500 ml. of methanol there are added 20 g. of 7-methylsulfinylacridone-2-carboxylic acid. The resultant mixture is stirred for 2 hours and is then evaporated to dryness to give the ammonium salt of 7-methylsulfinylacridone-2-carboxylic acid.

A solution of 10 g. of N,7-dimethylacridone-2-carboxylic acid in 50 ml. of thionyl chloride is heated at reflux for one hour. Thereafter, the solution is evaporated to dryness to give the corresponding acid chloride to which is added a concentrated ethereal ammonia solution. The resultant solution is evaporated giving the ammonium salt of N,7-dimethylacridone-2-carboxylic acid.

In like manner, the lower alkyl amides can be prepared using monoalkylamine or dialkylamine in lieu of ammonia in the above procedures. Thus prepared, e.g. are:

7-isopropoxyacridone-2-carboxylic acid amide,
7-isopropylacridone-2-carboxylic acid N-methylamide,
N,7-dimethylacridone-2-carboxylic acid N,n-dimethylamide,
7-methoxyacridone-2-carboxylic acid N,N-diethylamide,
7-sulfoacridone-2-carboxylic acid N-ethylamide,
7-sulfamoylacridone-2-carboxylic acid N-n-propylamide, and so forth.

EXAMPLE 22

To a mixture of 20 grams of procaine and 500 ml. of aqueous methanol are added 20 g. of 7-methylacridone-2-carboxylic acid. The resultant mixture is stirred at room temperature for 16 hours. It is then evaporated under reduced pressure, to give the procaine salt of 7-methylacridone-2-carboxylic acid.

Similarly, the lysine, caffeine, and arginine salts thereof are obtained. In like manner, the e.g. procaine, lysine, caffeine, and arginine salts of the other acridone-2-carboxylic acids hereof are obtained.

EXAMPLE 23

The following illustrate the method by which the pharmaceutical compositions of the compounds hereof are prepared.

Sodium chloride (0.44 g.) is dissolved in 80 ml. of a (9.47 g/l. water) sodium hydrogen phosphate solution. A sodium dihydrogen phosphate (8.00 g/l. water) solution (20 ml.) is then added thereto. The resultant solution having a pH of 7.38 is sterilized in an autoclave. This vehicle is then added to solid, dry sodium N-methylacridone-2-carboxylate to give a preparation suitable for intravenous injection containing 2.5 mg. of sodium N-methylacridone-2-carboxylate per milliliter of total composition.

N,7-dimethylacridone-2-carboxylic acid is dissolved in a vehicle having a composition ranging from propylene glycol:water of 10:90 (w/w) to propylene glycol:water of 50:50 (w/w) to give an aerosol preparation suitable for inhalation.

Sodium 7-isopropoxyacridone-2-carboxylic acid (1 part) is mixed with from 1 to 10 parts (by weight) of lactose or urea to give a powder preparation suitable for administration by nebulization.

Tablet preparations suitable for oral administration are prepared by mixing the following ingredients in the indicated proportions:

| Component | Percent, by Weight |
|---|---|
| an acridone-2-carboxylic acid compound hereof | 0.5 – 70 |
| polyvinylpyrrolidone | 0.5 – 10 |
| starch | 10 – 25 |
| lactose | 20 – 75 |
| magnesium stearate | 0.1 – 1 |
| granulating fluids (e.g. aqueous methanol, water, chloroform) | |

EXAMPLE 24

Illustrative test procedures for the compounds hereof are as follows:

Normal female (Sprague-Dawley) rats of 140 to 160 grams each are passively sensitized intradermally by injection of rat anti-egg albumin reaginic sera. After 24 hours, each rat is challenged intravenously with 1.75 ml. of 0.4 percent Evans blue, 1 mg. egg albumin plus 0.125 mg. of N-methylacridone-2-carboxylic acid. Control rats receive no acridone-2-carboxylic acid. The dermal bluing is recorded 15 to 25 minutes later. The rats which receive the N-methylacridone-2-carboxylic acid exhibit a 100 percent inhibition of allergic reaction whereas the control rats exhibit no inhibition.

The above procedure is repeated using oral administration, with similar results.

EXAMPLE 25

A dosage of 100 mg. per kg. of body weight of N-methylacridone-2-carboxylic acid is given intraperitoneally to guinea pigs. Other pigs are left untreated to serve as controls. After treatment, the treated pigs and the controls are exposed to an aqueous spray of 0.05 percent histamine diphosphate (calc. as base), delivered by a nebulizer, until they exhibit a loss of righting ability. During exposure they are observed for severity of reaction. This ranges from slightly deeper breathing to deep breathing to preconvulsive gasping and ataxia to collapse. The pigs which receive the N-methylacridone-2-carboxylic acid exhibit a significant resistance to the histamine aerosol challenge, whereas all control pigs collapse within the exposure time.

The above procedure is repeated using N-methyl-7-isopropoxyacridone-2-carboxylic acid with similar results.

The trachea of a recently sacrificed guinea pig is removed by disection and cut between the segments of cartilege into rings containing tracheal muscle which are tied to form a 180° alternating smooth muscle tracheal chain. The thus produced continuous length of smooth muscle is mounted in a tissue bath maintained at 37°C with the upper end attached to a linear motion transducer which in turn is connected to a recorder. The responses of a standard, aminophylline, and 7-isopropoxyacridone-2-carboxylic acid are compared after introducing each separately into the bath in various amounts or concentrations. The results show a significant relaxation of the tracheal chain with the test compound.

Inhibition of reaginic antigen-antibody reactions in rats is regarded as representative of inhibition of human reaginic antigen-antibody reactions which occur during allergic episodes. Protection against histamine aerosol induced bronchoconstriction and relaxation of isolated tracheal chain is regarded as representative of human bronchopulmonary activity including bronchodilator activity. Subjects suffering from bronchopulmonary disorders are studied as to severity of bronchospasm and changes in severity by observable and measurable changes in expiratory function. Such measurements include quantitation of expiratory pulmonary air flow, measurable by such instruments as a peak flow meter, and comparison of pulmonary volumes before and after treatment with the subject compounds hereof, as measured by spirometric and/or plethysmographic methods. Subjective relief of the symptoms upon administration of the compounds hereof is evidenced by improvements in dyspnea, wheezing, cough and expectorated sputum.

What is claimed is:

1. The compound selected from those represented by the following formulas:

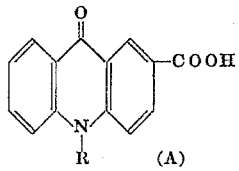 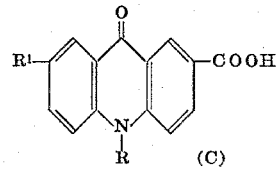

and the pharmaceutically acceptable, non-toxic lower alkyl and glycerol esters, unsubstituted, monoalkyl or dialkyl substituted amides and salts thereof; wherein each R is lower alkyl of from one to five carbon atoms and $R^1$ is lower alkyl of from one to five carbon atoms; lower cycloalkyl of from three to five carbon atoms; lower alkoxy of from one to five carbon atoms; lower cycloalkoxy of from three to five carbon atoms; hydroxy and alkanoyloxy of from one to seven carbon atoms, trichloracetoxy and 2-chloropropionyloxy esters thereof; halo; mercapto; lower alkylthio of from one to five carbon atoms; trifluoromethyl; or a group selected from those of the formulas:

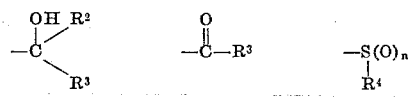

in which $R^2$ is hydrogen, lower alkyl of from one to five carbon atoms, or cycloalkyl of from three to six carbon atoms; $R^3$ is hydrogen, lower alkyl of from one to five carbon atoms, cycloalkyl of from three to six carbon atoms, phenyl, substituted phenyl (in which the substituent is halo, lower alkyl of from one to five carbon atoms, lower alkoxy of from one to five carbon atoms, lower alkylthio of from one to five carbon atoms, trifluoromethyl, or cyano); n is the integer 1 or 2; $R^4$ is lower alkyl of from one to five carbon atoms when n is 1 and $R^4$ is lower alkyl of from one to five carbon atoms, hydroxy, amino, monolower alkylamino of from one to five carbon atoms, or dilower alkylamino, wherein each of said lower alkyl groups is of one to five carbon atoms, when n is 2.

2. The compound according to claim 1 of Formula (A).

3. The compound according to claim 2 wherein R is methyl; N-methylacridone-2-carboxylic acid.

4. The compound according to claim 1 of Formula (C).

5. The compound according to claim 4 wherein R is methyl.

6. The compound according to claim 5 wherein $R^1$ is selected from isopropyl, isopropoxy, methylthio, methylsulfinyl, acetyl, chloro or fluoro.

7. The compound according to claim 5 wherein $R^1$ is isopropyl; N-methyl-7-isopropylacridone-2-carboxylic acid.

8. The compound according to claim 5 wherein $R^1$ is isopropoxy; N-methyl-7-isopropoxyacridone-2-carboxylic acid.

9. The compound according to claim 5 wherein $R^1$ is methylthio; N-methyl-7-methylthioacridone-2-carboxylic acid.

10. The compound according to claim 5 wherein $R^1$ is methylsulfinyl; N-methyl-7-methylsulfinylacridone-2-carboxylic acid.

11. The compound according to claim 5 wherein $R^1$ is acetyl; N-methyl-7-acetylacridone-2-carboxylic acid.

12. The compound according to claim 5 wherein $R^1$ is chloro or fluoro.

* * * * *